June 12, 1934. J. P. CROWLEY ET AL 1,962,767
SURFACING APPARATUS
Filed July 3, 1933    3 Sheets-Sheet 3
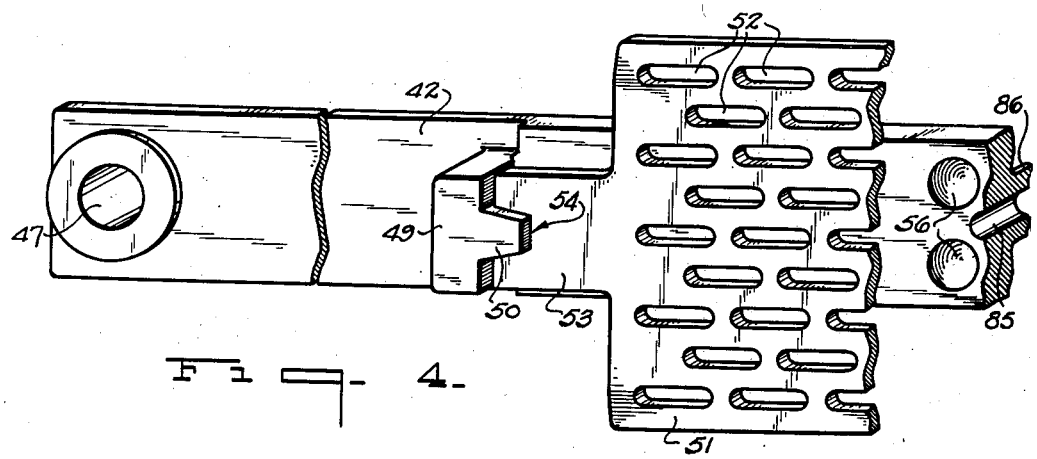
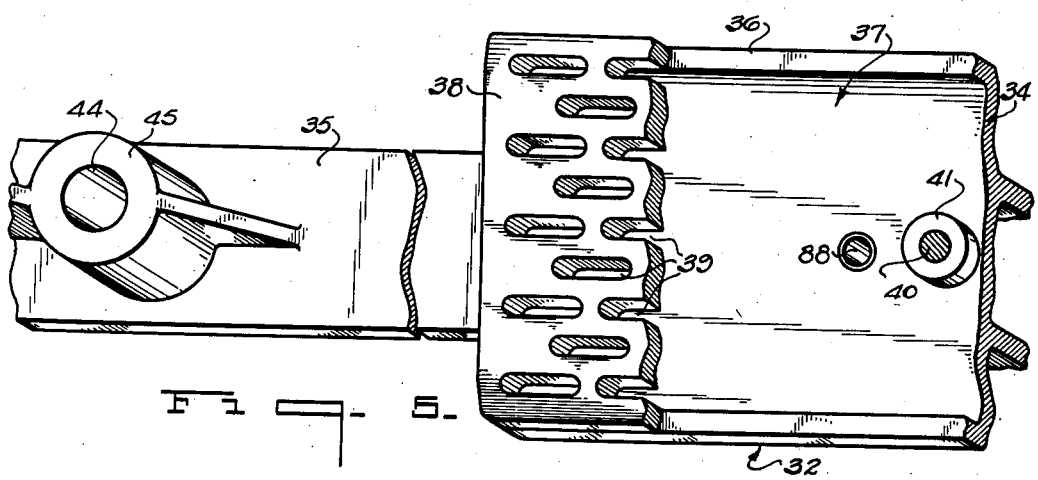
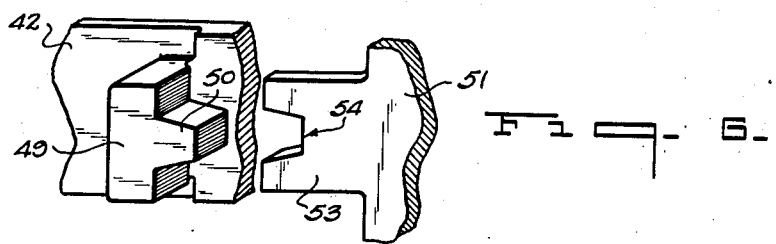
Inventors
JOSEPH P. CROWLEY.
GEORGE R. FORD JR.
By Frank Fraser
Attorney Patented June 12, 1934

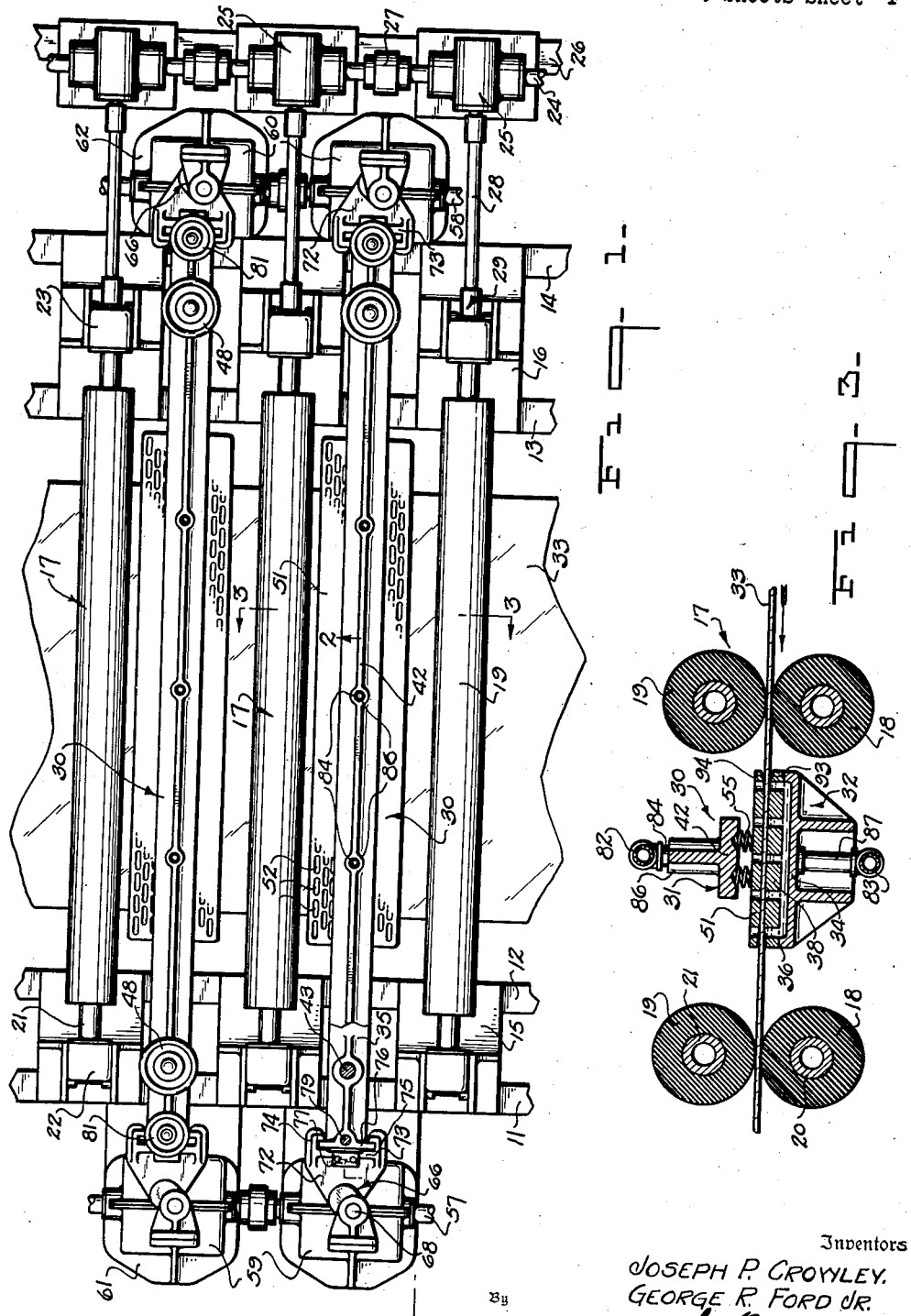
June 12, 1934.　　J. P. CROWLEY ET AL　　1,962,767
SURFACING APPARATUS
Filed July 3, 1933　　3 Sheets-Sheet 1
Inventors
JOSEPH P. CROWLEY.
GEORGE R. FORD JR.
Frank Fraser
Attorney

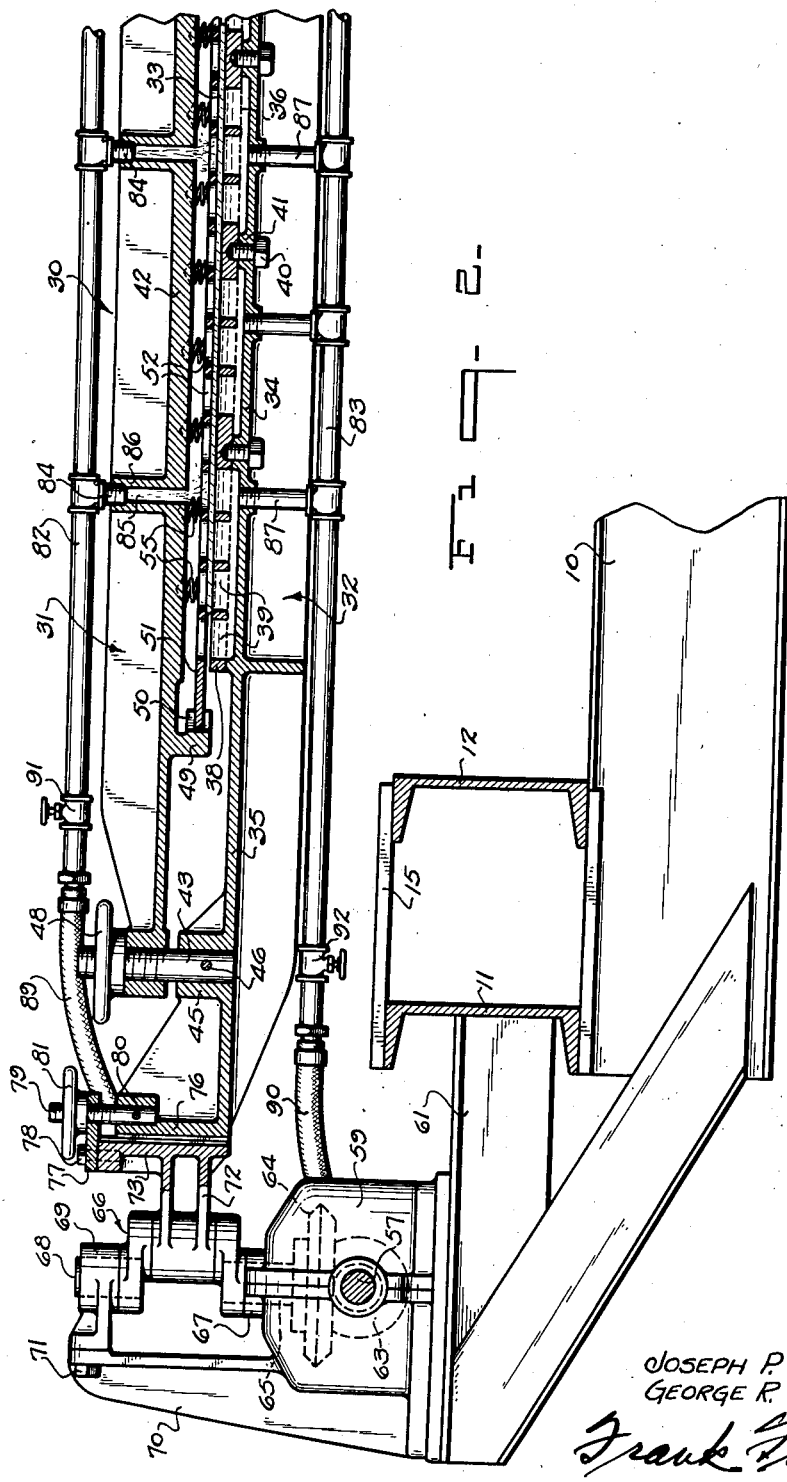

1,962,767

UNITED STATES PATENT OFFICE 1,962,767

SURFACING APPARATUS

Joseph P. Crowley and George R. Ford, Jr., Toledo, Ohio, assignors to Libbey-Owens-Ford Glass Company, Toledo, Ohio, a corporation of Ohio Application July 3, 1933, Serial No. 678,866

13 Claims. (Cl. 51—119)

The present invention relates to improvements in a machine or apparatus for surfacing (grinding and/or polishing) plate glass or other flat sheets or plates.

Heretofore, in the grinding and polishing of plate glass according to one well-known process, it has been customary to secure the sheets or plates of glass to be surfaced upon the tops of a series of cars or tables by embedding them within a layer of plaster of Paris or the like, said tables being then propelled forwardly to carry the glass sheets or plates in a definite substantially horizontal path first beneath and in contact with a series of grinding runners and then beneath and in contact with a series of polishing runners to surface the upper faces thereof, after which the said sheets are turned over upon the tables, again secured thereto, and then passed beneath the same or a second series of grinding and polishing runners to surface the second side.

Although such a system as referred to above has attained considerable commercial success, yet there are nevertheless certain features thereof which, if eliminated, would result in a system even more desirable and advantageous. For instance, in such system, the surfaces of the glass sheets or plates are, of course, treated separately so that considerable time is consumed in the grinding and polishing operations. Also, the securing of the glass sheets upon the tables is a difficult operation requiring skilled labor, while the turning over and manipulation of the glass sheets sometimes results in the breakage thereof, which is attendant with considerable danger to the workmen as well as waste incident to such breakage.

The aim and principal object of this invention, therefore, is to obviate those objectionable features noted above by the provision of a sheet glass surfacing machine or apparatus which will effect the grinding and/or polishing of opposite surfaces of the sheets or plates of glass simultaneously and while the said sheets are being continuously carried forwardly in a definite predetermined path, thereby resulting in a great saving of time and material and making it unnecessary to embed the sheets in plaster of Paris or the like.

Another important object of the invention is the provision of a glass surfacing apparatus by the use of which a considerable cheapening and shortening of the glass surfacing operations may be achieved, and also by means of which the amount of handling of the glass may be reduced to a minimum.

A further object of the invention is the provision of such an apparatus embodying a plurality of grinding and/or polishing units, each including a pair of surfacing elements between and in contact with which the glass sheets to be treated are passed, means being also provided for effecting a desired movement of the surfacing elements of each unit transversely of the path of travel of the glass.

Still further objects of the invention are the provision of a surfacing unit of novel and improved construction; the provision of improved means for supplying the abrasive material or polishing medium to the glass, and the provision of improved means for mounting the surfacing elements of each unit so that one of said elements is yieldably urged toward the other element.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view of a portion of a surfacing machine constructed in accordance with the present invention, Fig. 2 is a transverse section taken substantially on line 2—2 of Fig. 1, Fig. 3 is a detail section taken substantially on line 3—3 of Fig. 1, Fig. 4 is a perspective view of a portion of the upper surfacing runner looking at the bottom thereof, Fig. 5 is a perspective view, partially broken away, of a portion of the lower surfacing runner looking at the top thereof, and Fig. 6 is a detail perspective view of a portion of the upper surfacing runner.

Referring now more particularly to the drawings, the operative parts of the surfacing machine are carried upon a suitable sub-structure or supporting framework which has not been completely shown in detail but which includes a plurality of spaced parallel transversely extending I-beams 10 which are arranged at spaced points throughout the length of the machine and suitably supported in any desired manner. Carried upon the I-beams 10 at one side of the machine are the spaced longitudinally extending channel beams 11 and 12, while supported upon the I-beams 10 at the opposite side of the machine are the spaced longitudinally extending channel beams 13 and 14. Extending between and carried by the channel beams 11 and 12 are a plurality of spaced horizontal plates 15, while a plurality of similar plates 16 are carried by the channel beams 13 and 14, the plates 15 and 16 being arranged opposite one another.

The numeral 17 designates generally a plurality of pairs of horizontally aligned sheet supporting and feeding rolls, each pair including a lower roll 18 and an upper roll 19. The rolls 18 and 19 are preferably constructed of relatively hard rubber or some other suitable material and are carried by shafts 20 and 21 respectively. The plurality of pairs of conveying rolls 17 are all mounted for rotatable movement, and to this end the shafts 20 and 21 of each pair of rolls are journaled at their opposite ends in bearings 22 and 23 mounted upon the supporting plates 15 and 16.

For the purpose of simultaneously driving the several pairs of rolls 17, there is arranged at one side of the machine a longitudinally extending drive shaft 24 driven from any suitable motor or prime mover (not shown). This shaft extends through a plurality of gear casings 25, one of which is provided opposite the adjacent end of each pair of rolls 17; being mounted upon a horizontal channel beam 26 extending longitudinally of the machine. The shaft 24 may consist of a plurality of relatively short sections connected end to end by flexible couplings 27. Each gear case 25 contains suitable reduction gearing and the rolls 18 and 19 are driven from the drive shaft 24 through the intermediary of this reduction gearing and the relatively short tumbler shafts 28 which are connected to the roll shafts 20 and 21 by suitable coupling means 29.

Arranged between the adjacent pairs of conveying rolls 17 are a plurality of surfacing units 30, each unit including the horizontally arranged upper and lower runners 31 and 32 respectively between which the glass sheets 33 to be treated are passed. These grinding units 30 are arranged alternately with the pairs of rolls 17, and the runners 31 and 32 of each unit are superimposed one above and one below the path of travel of the sheet so as to act upon opposite surfaces thereof simultaneously at it is passed therebetween.

The lower surfacing runner 32 of each unit includes an elongated main supporting casting or member 34 extending transversely of the machine and having reduced end portions 35. That relatively wide part of the member 34 between the end portions 35 may be said to constitute the body portion thereof and this body portion is provided along its opposite side and end edges with an upstanding continuous flange 36 completely surrounding the said body portion and cooperating with the upper surface of said member to form a relatively shallow rectangular receptacle 37 within which abrasive material or a polishing medium is adapted to be received.

The numeral 38 designates the lower grinding element which is in the form of a relatively thin flat rectangular plate preferably of metal and having a large number of openings 39 distributed over the entire area thereof, said openings being of any suitable shape and arranged in any desired manner. However, the openings are here shown as being elongated and arranged in a plurality of rows extending longitudinally of the plate, with the openings of adjacent rows being staggered and the openings of alternate rows being in alignment with one another.

The grinding element or plate 38 is coextensive with the body portion of the supporting member 34 and rests directly upon the continuous flange 36, being secured to the said supporting member by a plurality of screws 40 which pass upwardly through bosses 41 carried by said member and are threaded within openings in the plate. The bosses 41 also afford additional points of support for the grinding plate 31 as clearly shown in Fig. 2.

The upper surfacing runner 31 includes an elongated supporting bar or beam 42 arranged directly above the main supporting member 34 of the lower runner and removably carried thereby. The beam 42 is, however, slightly shorter than the main supporting member 34 and is slidably mounted for vertical movement at its opposite ends upon vertical pins 43, said pins being received at their lower ends within openings 44 in bosses 45 carried by the reduced end portions 35 of member 34 and secured in place as at 46. Each pin 43 passes upwardly through an opening 47 in the beam 42 and has threaded upon its upper end an adjusting wheel 48.

The supporting member 42 of the upper surfacing runner is provided adjacent its opposite ends with depending portions 49 having inwardly directed vertical tongues 50. The numeral 51 designates the upper grinding element which is also in the form of a relatively thin substantially rectangular metal plate having a plurality of openings 52 therein which are preferably arranged in the same manner as the openings in the lower grinding element 38. The upper grinding plate is provided at each end thereof with a reduced ear 53 formed with a groove or slot 54 for loosely receiving the respective tongue 50 therein.

Disposed between the upper grinding plate 51 and the supporting member 42 are a plurality of relatively small compression springs 55, said springs being preferably arranged in two longitudinally extending rows, as best shown in Fig. 3, and having their upper ends received within slight recesses or depressions 56 formed in the under surface of supporting member 42 whereby to maintain the said springs in proper position. From the above, it will be seen that the upper grinding plate 51 is capable of free vertical sliding movement upon the tongues 50 and that the springs 55 serve to urge the said plate downwardly toward the lower grinding element 38 and to hold the same in yieldable engagement with the glass sheet 33 passing therebetween. The entire weight of the upper runner 31 rests upon the glass sheet and the grinding plate 51 is movable freely vertically relative to the supporting beam 42. Upon rotation of the hand wheels 81, the compression of springs 55 may be varied as desired to determine the pressure exerted upon the glass.

The several grinding units 30 are preferably positively driven simultaneously from the opposite ends thereof and to accomplish this, there are arranged at opposite sides of the machine the two longitudinally extending drive shafts 57 and 58, the shaft 57 passing through a plurality of housings 59, while the shaft 58 passes through a plurality of similar housings 60. The housings 59 and 60 are positioned opposite one another and are mounted upon horizontal platforms 61 and 62 respectively suitably carried by the supporting framework of the machine. A pair of housings 59 and 60 is provided for each grinding unit.

Mounted upon each of the shafts 57 and 58 within each of the housings 59 and 60 is a spiral gear 63 meshing with and driving a spiral gear 64 carried by the lower end 65 of a rotatable crank 66. The lower end 65 of crank 66 is rotatably supported in a bearing 67 formed as a part of the respective housing 59 or 60 while the opposite end 68 of the crank is journaled in a bearing 69 removably secured to a bracket 70 by screws or bolts 71.

Pivotally mounted upon the crank 66 is a horizontal crank arm 72 having formed integral with the outer end thereof a vertical bracket member 73, said member being provided at its opposite sides with inwardly directed flanges 74 and 75 respectively, said flanges cooperating with one another to provide a guideway therebetween within which is slidably received the adjacent end of the main supporting member 34 of the lower runner. More specifically, there is carried by or formed integral with each end of the supporting member 34 a vertical guide plate 76 which is received within the guideway formed by the flanges 74 and 75, said guide plate being slightly wider than the reduced end portion 35 of the said supporting member.

Carried upon the top of each bracket member 73 is a horizontal plate 77 secured in place by screws or the like 78. Passing loosely through the plate 77 is a vertical pin 79 secured at its lower end within an opening in the main supporting member 34 as at 80 and having threaded upon its upper end an adjusting wheel 81. Upon rotation of the adjusting wheels 81 at opposite ends of the grinding unit, it will be readily apparent that the upper and lower grinding runners 31 and 32 of each unit can be moved bodily vertically.

Upon rotation of the line shafts 57 and 58, the spiral gears 63 and 64 will effect rotation of the cranks 66 so as to impart an oscillatable movement to the grinding units 30 transversely of the path of travel of the glass sheets 33. It will of course be apparent that since the upper and lower grinding runners of each unit are connected together, they will oscillate in unison. All of the grinding units can be caused to move in the same direction simultaneously or, if preferred, alternate units may move in opposite directions.

The grinding action is ordinarily achieved by a relative movement between the grinding elements and the glass in conjunction with a suitable abrasive material. The abrasive material may be supplied to the operative faces of the upper and lower grinding elements or plates 51 and 32 through the supply conduits 82 and 83 respectively, which conduits extend longitudinally of the runners and are mounted for movement therewith. Thus, the upper conduit 82 is provided with a plurality of depending lateral outlet pipes 84 which are secured within the upper ends of openings 85 in sleeve portions 86 formed integral with the supporting member 42; the abrasive material flowing downwardly through the said openings onto the upper grinding element 51 and then passing through the openings 52 therein onto the glass. On the other hand, the lower conduit 83 is provided with a plurality of vertical lateral outlet pipes 87 threaded at their upper ends within openings 88 (Fig. 5) formed in the bottom of the main supporting member 34 so that the abrasive material is discharged into the relatively shallow receptacle 37. Sufficient abrasive material is continuously supplied so as to not only maintain the receptacle 37 full, but also the openings 39 in the lower grinding element 38, as best shown in Fig. 2.

The conduits 82 and 83 for feeding the abrasive material to the grinding elements may be associated with and adapted to receive the abrasive material from any suitable abrasive grading and feeding system. While the runners of each unit are adapted to receive the same grade of abrasive, yet the runners of each succeeding grinding unit may receive a different grade of abrasive, if desired, so as to effect the proper treatment of the glass from rough grinding to final smoothing.

Since the conduits 82 and 83 oscillate with the grinding runners, they are preferably connected with the abrasive grading and feeding system by suitable flexible conduits 89 and 90. Valves 91 and 92, interposed in the conduits 82 and 83 respectively, serve to control the flow of abrasive material to the grinding runners.

In operation, the glass sheets 33 are carried successively between the surfacing elements 38 and 51 of the several grinding units 30 by means of the pairs of rotatable rolls 17. The machine may include any desired number of grinding units and as the sheets are carried through the machine, the several units are oscillated in the manner above described and a suitable abrasive material delivered thereto so as to effect the grinding of the glass.

The machine may also embody the use of a plurality of polishing units following the grinding units and while not essential, these units may be of substantially the same construction and operated in the same manner as the grinding units. However, the operative working faces of the polishing elements will be covered with a suitable polishing pad of felt or the like which will have the desired polishing action upon the glass.

In order to facilitate the feeding of the glass sheets between the several pairs of grinding runners, the longitudinal edges of the grinding plates 38 and 51 of each unit may be slightly beveled as indicated at 93 and 94 in Fig. 3.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for surfacing sheet glass, means for passing the sheets to be treated in a definite predetermined path, a surfacing unit including spaced superimposed surfacing elements comprising substantially flat plates engaging opposite faces of said sheets to simultaneously surface the same during the travel thereof, a main supporting member for supporting the lower surfacing plate, means carried by the main supporting member for supporting the upper surfacing plate, means for moving the said main supporting member and the surfacing plates carried thereby transversely of the path of travel of the sheets, the upper surfacing plate being associated with its supporting means for vertical movement relative thereto, and means interposed between the upper surfacing plate and its supporting means and engaging the former for yieldably urging the said plate downwardly toward the lower surfacing plate and for maintaining it in engagement with the glass.

2. In apparatus for surfacing sheet glass, means for passing the sheets to be treated in a definite predetermined path, a surfacing unit including spaced superimposed surfacing elements comprising substantially flat plates engaging opposite faces of said sheets to simultaneously surface the same during the travel thereof, a main supporting member for supporting the lower surfacing plate, a member carried by the main supporting member for supporting the upper surfacing plate, means connected with the main supporting member for moving the same and the surfacing plates carried thereby transversely of the path of travel of the sheets, the upper surfacing plate having slidable connection with its supporting member so that it can move vertically relative thereto, and spring means interposed between the upper surfacing plate and its supporting member and engaging the former for yieldably urging the said plate downwardly toward the lower surfacing plate and for maintaining it in engagement with the glass.

3. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, a main supporting member for supporting the lower surfacing element, a member carried by the main supporting member for supporting the upper surfacing element, means connected with the main supporting member for moving the same and the surfacing elements carried thereby transversely of the path of travel of the sheets, the upper surfacing element being positioned beneath its supporting member and having a tongue and groove connection therewith so that it is movable vertically relative thereto, and a plurality of compression springs interposed between the upper surfacing element and its supporting member for yieldably urging the said element downwardly toward the lower surfacing element and for maintaining it in engagement with the glass.

4. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, a main supporting member for supporting the lower surfacing element, vertical pins carried by said supporting member, a member slidably mounted for vertical movement upon said pins, the upper surfacing element having slidable connection with said second named member so that it can move vertically relative thereto, spring means interposed between the upper surfacing element and the second mentioned member for yieldably urging the said element downwardly toward the lower surfacing element and for maintaining it in engagement with the glass, hand wheels carried by the vertical pins above the said second named member for controlling the upward movement of the latter, and means connected with the main supporting member for moving the same and the surfacing elements carried thereby transversely of the path of travel of the sheets.

5. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, a main supporting member for supporting the lower surfacing element, vertical pins carried by said supporting member, a member slidably mounted for vertical movement upon said pins, the upper surfacing element being positioned below said second mentioned member and having a tongue and groove connection therewith so that it is movable vertically relative thereto, a plurality of springs interposed between the upper surfacing element and the second mentioned member for yieldably urging the said element downwardly toward the lower surfacing element and for maintaining it in engagement with the glass, hand wheels carried by the vertical pins above the said second named member for controlling the upward movement of the latter, and means connected with the main supporting member for moving the same and the surfacing elements carried thereby transversely of the path of travel of the sheets.

6. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, a main supporting member for supporting the lower surfacing element, means carried by the main supporting member for supporting the upper surfacing element, means for moving the said main supporting member and the surfacing elements carried thereby transversely of the path of travel of the sheets, the main supporting member including a body portion having a continuous vertical flange completely encircling the same and cooperating with the upper surface thereof to form a relatively shallow receptacle, the lower surfacing element comprising a perforated plate coextensive with said body portion and resting upon said flange, means for securing the lower surfacing element to said main supporting member, and means for feeding an abrasive material into said receptacle.

7. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, a main supporting member for supporting the lower surfacing element, means carried by the main supporting member for supporting the upper surfacing element, means for moving the said main supporting member and the surfacing elements carried thereby transversely of the path of travel of the sheets, the main supporting member including a body portion having a continuous vertical flange completely encircling the same and cooperating with the upper surface thereof to form a relatively shallow receptacle, the lower surfacing element comprising a perforated plate coextensive with said body portion and resting upon said flange, means for securing the lower surfacing element to said main supporting member, and means for feeding an abrasive material into said receptacle; the upper surfacing element also comprising a perforated plate and means for supplying an abrasive material thereto.

8. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, a main supporting member for supporting the lower surfacing element, means carried by the main supporting member for supporting the upper surfacing element, means for moving the said main supporting member and the surfacing elements carried thereby transversely of the path of travel of the sheets, the main supporting member including a body portion having a continuous vertical flange completely encircling the same and cooperating with the upper surface thereof to form a relatively shallow receptacle, the lower surfacing element comprising a perforated plate coextensive with said body portion and resting upon said flange, means for securing the lower surfacing element to said main supporting member, and means for feeding an abrasive material into said receptacle; the upper surfacing element also comprising a perforated plate having slidable connection with its supporting means so that it can move freely vertically relative thereto, spring means interposed between the upper surfacing element and its supporting means for yieldably urging the said element downwardly toward the lower surfacing element and for maintaining it in engagement with the glass, and means for supplying an abrasive material to said upper surfacing element.

9. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, a main supporting member for supporting the lower surfacing element, means carried by the main supporting member for supporting the upper surfacing element, means for moving the said main supporting member and the surfacing elements carried thereby transversely of the path of travel of the sheets, the main supporting member including a body portion having a continuous vertical flange completely encircling the same and cooperating with the upper surface thereof to form a relatively shallow receptacle, the lower surfacing element comprising a perforated plate coextensive with said body portion and resting upon said flange, means for securing the lower surfacing element to said main supporting member, and means for feeding an abrasive material into said receptacle; the upper surfacing element also comprising a perforated plate positioned below its supporting means and having a tongue and groove connection therewith so that it is movable freely vertically relative thereto, a plurality of compression springs interposed between the upper surfacing element and its supporting means for yieldably urging the said element downwardly toward the lower surfacing element and for maintaining it in engagement with the glass, and means for feeding an abrasive material to the upper surfacing element.

10. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, supporting members for the upper and lower surfacing elements, means for moving the said elements as a unit transversely of the path of travel of the glass sheets including a vertical guide plate at each end of the supporting member for the lower surfacing element, a rotatable crank carrying a bracket member formed with a vertical guideway for slidably receiving the guide plate therein, and means carried by the bracket member and connected with the supporting member for the lower surfacing element for raising and lowering the surfacing elements bodily vertically as a unit.

11. In apparatus for surfacing sheet glass, means for passing the sheets to be treated in a definite predetermined path, a surfacing unit including spaced superimposed surfacing elements engaging opposite faces of said sheets to simultaneously surface the same during the travel thereof, a main supporting member for supporting the lower surfacing element, vertical pins carried by said supporting member, a member slidably mounted for vertical movement upon said pins, the upper surfacing element having slidable connection with said second mentioned member so that it can move freely vertically relative thereto, spring means interposed between the upper surfacing element and the second mentioned member for yieldably urging the said element downwardly toward the lower surfacing element and for maintaining it in engagement with the glass, hand wheels carried by the vertical pins above the said second mentioned member for controlling the upward movement of the latter, means for moving the upper and lower surfacing elements as a unit transversely of the path of travel of the glass sheets including a vertical guide plate at each end of the main supporting member, a rotatable crank carrying a bracket member formed with a vertical guideway for slidably receiving the guide plate therein, and means carried by the bracket member and connected with said main supporting member for raising and lowering the surfacing elements bodily vertically as a unit.

12. In apparatus for surfacing sheet glass, means for conveying the sheets to be treated in a generally horizontal direction, a surfacing unit including spaced superimposed surfacing elements comprising substantially flat perforated plates engaging opposite faces of said sheets to simultaneously surface the same during the travel thereof, a main supporting member for supporting the lower surfacing plate, means carried by the main supporting member for supporting the upper surfacing plate, means for moving the said main supporting member and the surfacing plates carried thereby transversely of the path of travel of the sheets, and means for feeding an abrasive material to the back of each surfacing plate where it will pass through the openings therein onto the glass.

13. In apparatus for surfacing sheet glass, means for conveying the sheets to be treated in a generally horizontal direction, a surfacing unit including spaced superimposed surfacing elements comprising substantially flat perforated plates engaging opposite faces of said sheets to simultaneously surface the same during the travel thereof, a main supporting member for supporting the lower surfacing plate, means carried by the main supporting member for supporting the upper surfacing plate, means for moving the said main supporting member and the surfacing plates carried thereby transversely of the path of travel of the sheets, a plurality of compression springs interposed between the upper surfacing plate and its supporting means and engaging the former for yieldably urging the said plate downwardly toward the lower surfacing plate and for maintaining it in engagement with the glass, and means for feeding an abrasive material to the back of each surfacing plate where it will pass through the openings therein onto the glass.

JOSEPH P. CROWLEY.
GEORGE R. FORD, JR.